(12) United States Patent
Thuries

(10) Patent No.: US 9,959,441 B2
(45) Date of Patent: May 1, 2018

(54) SYSTEM FOR GENERATING AN EXTENDED SPECULAR LIGHTING FIELD

(75) Inventor: Serge Thuries, Saint Jean (FR)

(73) Assignee: Intermec IP Corp., Everett, WA (US)

( * ) Notice: Subject to any disclaimer, the term of this patent is extended or adjusted under 35 U.S.C. 154(b) by 480 days.

(21) Appl. No.: 13/015,341

(22) Filed: Jan. 27, 2011

(65) Prior Publication Data

US 2012/0193420 A1 Aug. 2, 2012

(51) Int. Cl.
*G06K 7/10* (2006.01)

(52) U.S. Cl.
CPC ..... *G06K 7/10831* (2013.01); *G06K 7/10564* (2013.01); *G06K 7/10683* (2013.01)

(58) Field of Classification Search
USPC ...................................... 235/454, 455, 462.4
See application file for complete search history.

(56) References Cited

U.S. PATENT DOCUMENTS

| | | | |
|---|---|---|---|
| 4,660,984 A * | 4/1987 | MacDonald | 356/446 |
| 5,449,892 A * | 9/1995 | Yamada | G06K 7/10594 235/462.35 |
| 5,811,777 A | 9/1998 | Ackley | |
| 6,820,811 B1 * | 11/2004 | Detwiler | 235/462.37 |
| 7,428,995 B1 * | 9/2008 | Stern | G06K 7/10742 235/462.01 |
| 2005/0040238 A1* | 2/2005 | Byun et al. | 235/462.43 |
| 2008/0142604 A1* | 6/2008 | Nunnink | 235/473 |
| 2009/0084848 A1* | 4/2009 | Liu | G06K 7/10722 235/455 |

* cited by examiner

*Primary Examiner* — Rafferty Kelly
(74) *Attorney, Agent, or Firm* — Additon, Higgins & Pendleton, P.A.

(57) ABSTRACT

A system for generating an extended specular lighting field for reading symbols on a reflective background surface is described. A scanner generates illumination for illuminating the symbols. Reflection of the illumination incident upon the reflective surface is retroreflected onto the symbols on the reflective surface. Reflection of the retroreflected light by the reflective surface is received by the scanner for processing information about the symbols. By using the reflective surface to help illuminate the symbols, an ordinary scanner can be used to read the symbols.

19 Claims, 9 Drawing Sheets

SYSTEM FOR GENERATING AN EXTENDED SPECULAR LIGHTING FIELD

BACKGROUND

Direct part marking is a process for permanently marking the surface of parts, such as surgical equipment, electronics components, and aerospace parts, with machine-readable symbols that contain encoded information. Many different types of marking methods can be used, for example, dot peen, electro-chemical etching, laser etching, and cast marks.

Examples of machine-readable symbols include linear barcodes, matrix barcodes, and text, and these machine-readable symbols are generally read with a scanner or imager having a point light source, such as a laser or light-emitting diode. The marked surface can be very shiny, and thus highly reflective. Consequently, when the point light source in the scanner illuminates the symbols on the specular surface, the image reflected back to the scanner is unreadable because it is too intense.

BRIEF DESCRIPTION OF THE DRAWINGS

Examples of a system generating an extended specular lighting field are illustrated in the figures. The examples and figures are illustrative rather than limiting.

DETAILED DESCRIPTION

Figure 1:
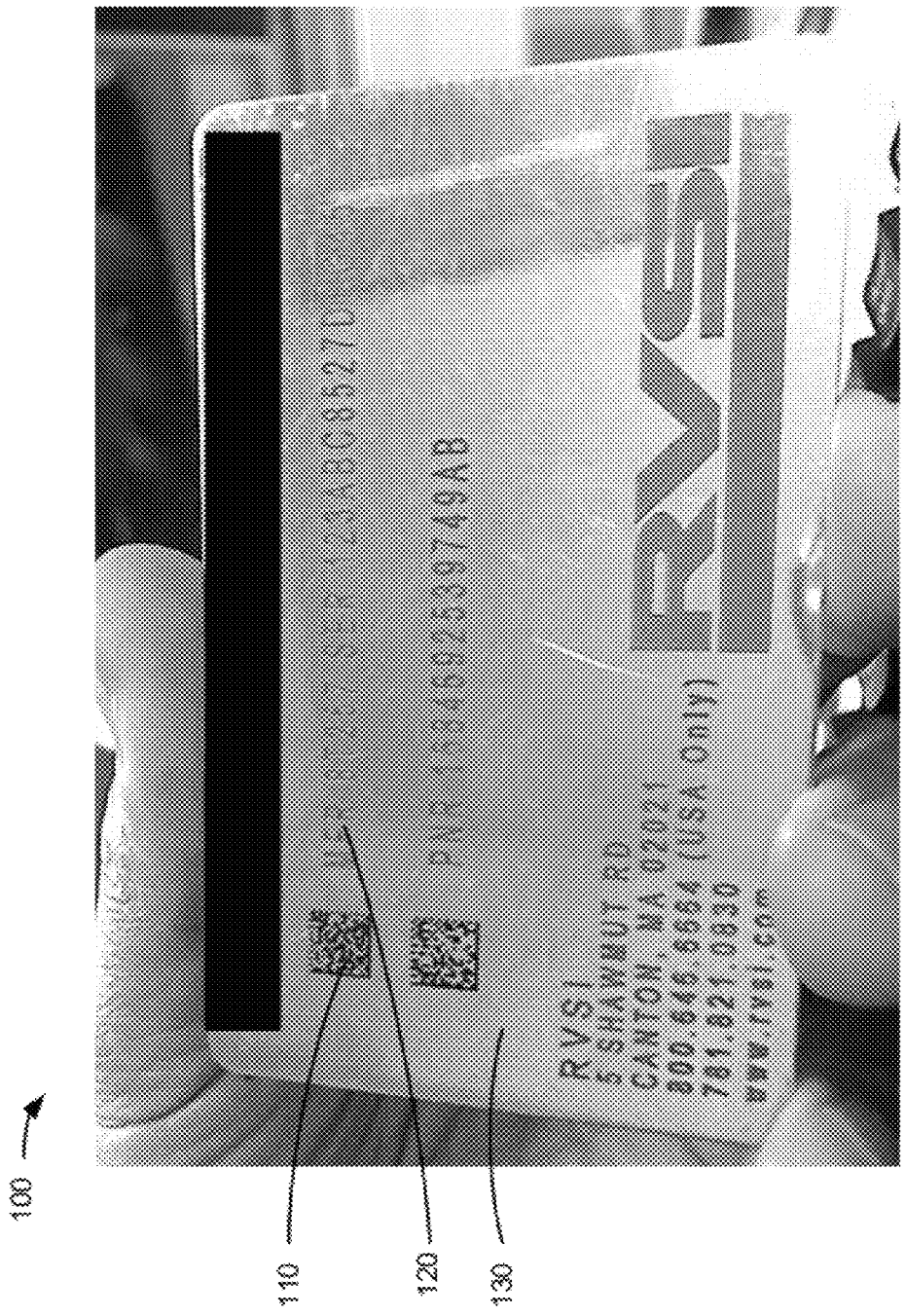
FIG. 1 shows a photograph illustrating an example of direct part markings on a highly reflective, specular surface.

A system is described for generating an extended, specular lighting field for reading information that is difficult to automatically read, such as direct part marking (DPM) symbols on a highly reflective surface. A conventional scanner that is useful for reading machine-readable symbols on a non-specular background is used in conjunction with retroreflective material that can be removably mounted on the scanner. In this configuration, the light source in the scanner generates illumination that impinges on the DPM symbols, and the illumination is reflected towards the retroreflective material which, in turn, retroreflects the illumination back to the DPM symbols. Upon striking the reflective surface on which the DPM symbols are located a second time, the retroreflected light is reflected to a sensor in the scanner. This configuration allows the light source of the scanner to use the specular surface to illuminate itself with an extended lighting field.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

The techniques to be presented below permit DPM symbols on highly reflective, specular surfaces to be imaged using a conventional scanner, even when the light source in the scanner is a point light source, such as a laser or light-emitting diode. The techniques do not require an extended source of light, nor do they require special electronic circuitry responsive to the brightness of the image reflected from the specular surface.

Conventional scanners for reading and capturing data use one or more light-emitting diodes (LEDs) to illuminate the symbols to be read. Because LEDs are inexpensive, yet robust, it is desirable to use LEDs as light sources in scanners. Furthermore, LEDs work very well as a scanner light source when the symbols to be read are printed on a substrate having Lambertian reflectivity, such as paper. However, an LED is essentially a point light source. When a point light source illuminates symbols on a highly reflective or specular surface, the scanner sensor captures an image of the point light source, and the image of the point light source is not sufficiently large or sufficiently uniform to illuminate the DPM symbols.

FIG. 1 shows a photograph 100 illustrating an example of DPM symbols on a highly reflective, metallic specular surface 130. Examples of a black matrix barcode 110 and text markings 120 are shown in the photograph 100.

Figure 2A:
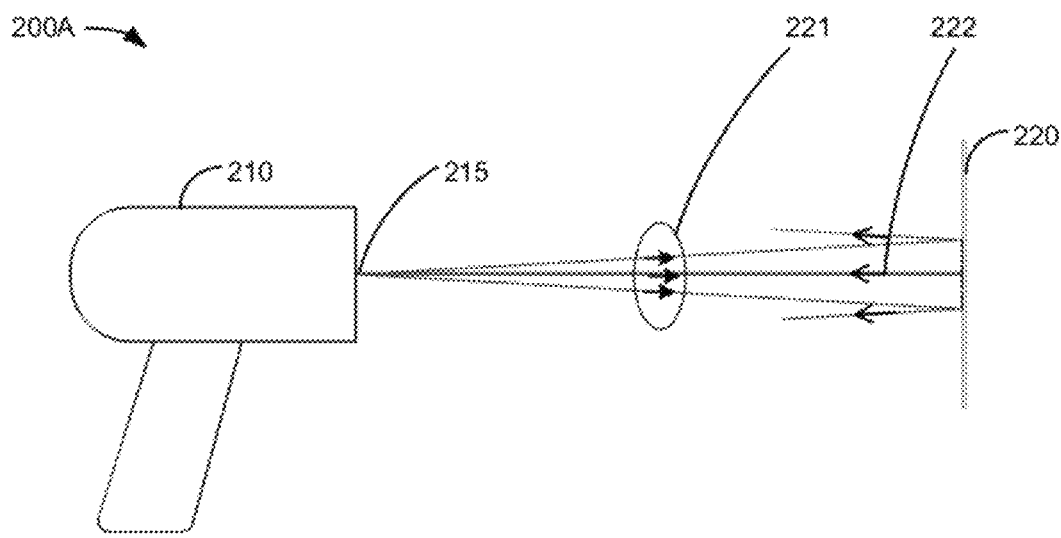
FIGS. 2A and 2B show a diagram of light rays from a scanner impinging on a specular surface at normal incidence (FIG. 2A) and an image of the specular surface of the markings of FIG. 1 illuminated in this configuration (FIG. 2B).

FIG. 2A shows a configuration 200A where a scanner 210 using a point light source emits illumination 215 towards a highly reflective surface 220 at normal incidence. The light rays 221 from the point source reflect off the specular surface 220, and light represented by ray 222 reflects directly back to the sensor in the scanner 210.

Figure 2B:
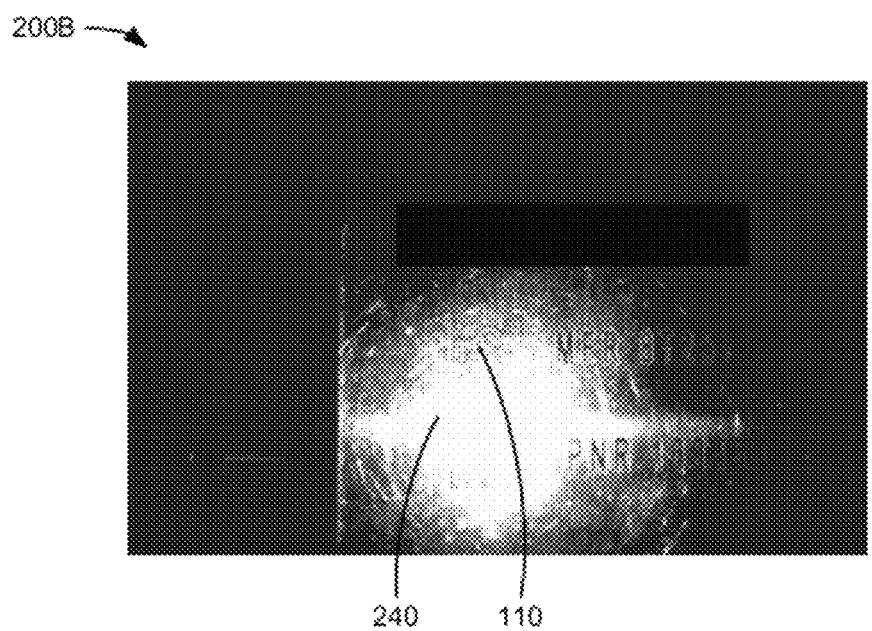

FIG. 2B shows an image 200B of the specular surface 220 when the surface 220 is illuminated by the scanner 210 at normal incidence. The specular surface 220 is the same as the surface 130 shown in FIG. 1. The image in FIG. 2B and all other images of specular surfaces shown in FIGS. 3B, 5B, and 6B were obtained with an Intermec SR61THP scanner by Intermec Corporation of Everett, Wash. Due to the high reflectivity of the surface 220, the image is dominated by the image 240 of the LED point light source of the scanner. Thus, when the scanner 210 is aimed towards DPM symbol 110, the reflection 240 of the point source washes out the DPM symbol 110, and the DPM symbol 110 is unreadable by the scanner.

Figure 3A:
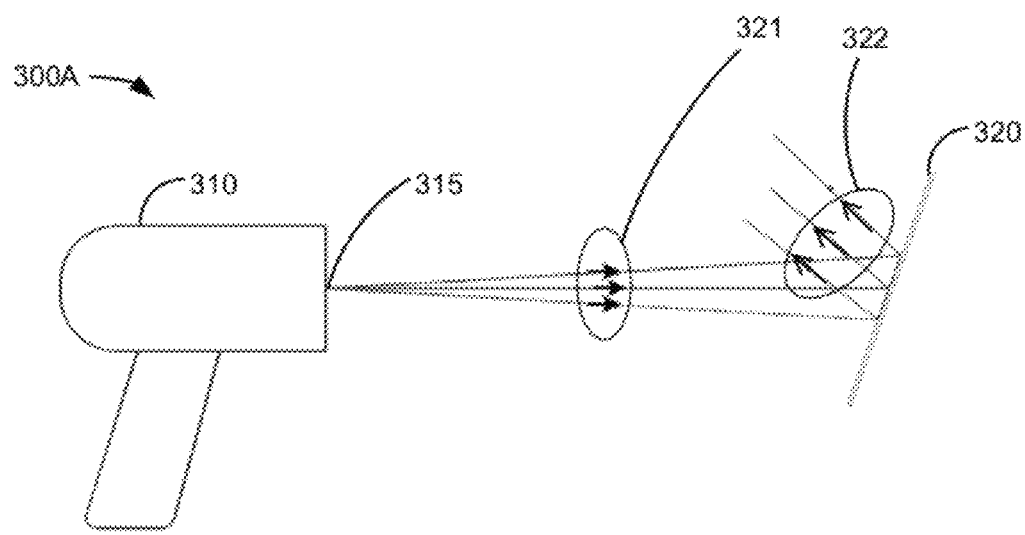
FIGS. 3A and 3B show a diagram of light rays from a scanner impinging on reflecting from a specular surface at an angle (FIG. 3A) and an image of the specular surface of the markings of FIG. 1 illuminated in this configuration (FIG. 3B).
Figure 3B:
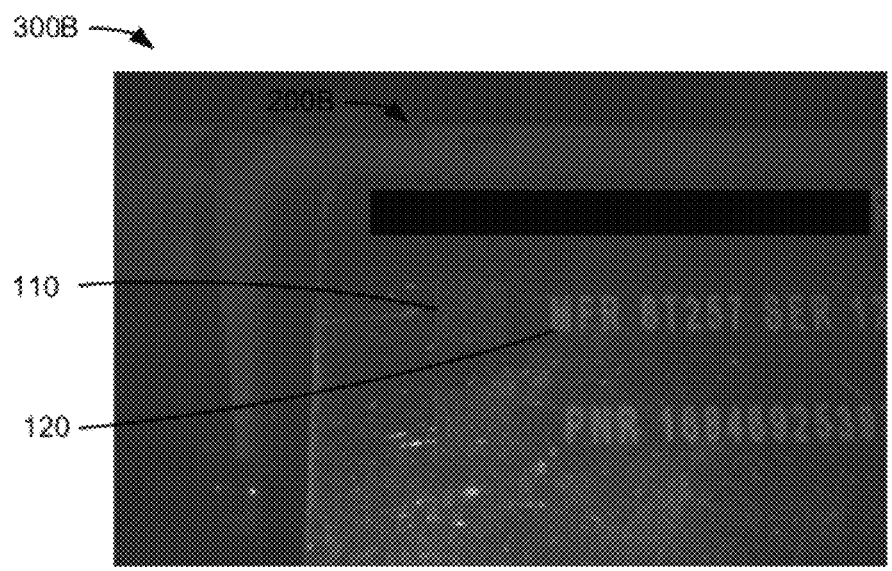

Moreover, depending upon the reading angle of the scanner, the sensor in the scanner can receive direct reflection from only the central light rays in the light bundle, as shown in FIG. 2A, or no light at all. FIG. 3A shows a configuration 300A where a scanner 310 using a point light source emits illumination 315 towards a highly reflective surface 320 at an angle to the surface 320. The light rays 321 from the point source reflect off specular surface 320 as light rays 322 which are directed away from the scanner 310. Because the tilt angle between the incident illumination 315 and the surface 320 is too large in the configuration 300A, no light from the surface 320 reflects back to the sensor in the scanner 310, resulting in a dark image. FIG. 3B shows the dark image 300B of the specular surface 320 illuminated in this configuration. The specular surface 320 is the same as the specular surface 130 shown in FIG. 1, and the DPM symbol 110 is dark in image 300B.

Although the properties of the specular surface present difficulties in reading marks on the surface, the inventors have discovered that the specular surface can be used advantageously to illuminate itself in conjunction with retroreflective material. Retroreflective material is made up of a large number of smaller retroreflectors. Each of the smaller component retroreflectors has a large cone of reflection, such that when light impinges on a component retroreflector within the cone of reflection, the light reflects in the same direction from which it originated. When illumination from a point light source reflects from the specular surface and impinges upon a piece of retroreflective material, the light is retroreflected by each of the large number of component retroreflectors so that the piece of retroreflective material emulates a large number of light sources. Thus, for example, if the source of light in the scanner is a single point source and the light reflects from a specular surface onto, say 500 component retroreflectors of a piece of retroreflective material, the component retroreflectors direct the light back toward the specular surface, and the surface is essentially illuminated with 500 point sources of light. The piece of retroreflective material acts like an extended light source to illuminate the specular surface.

Moreover, the retroreflective material is highly directive because it confines the reflected light into a narrow cone. As a result, unlike with extended sources of light, the retroreflected light does not decrease with distance from the retroreflective material.

Figure 4:
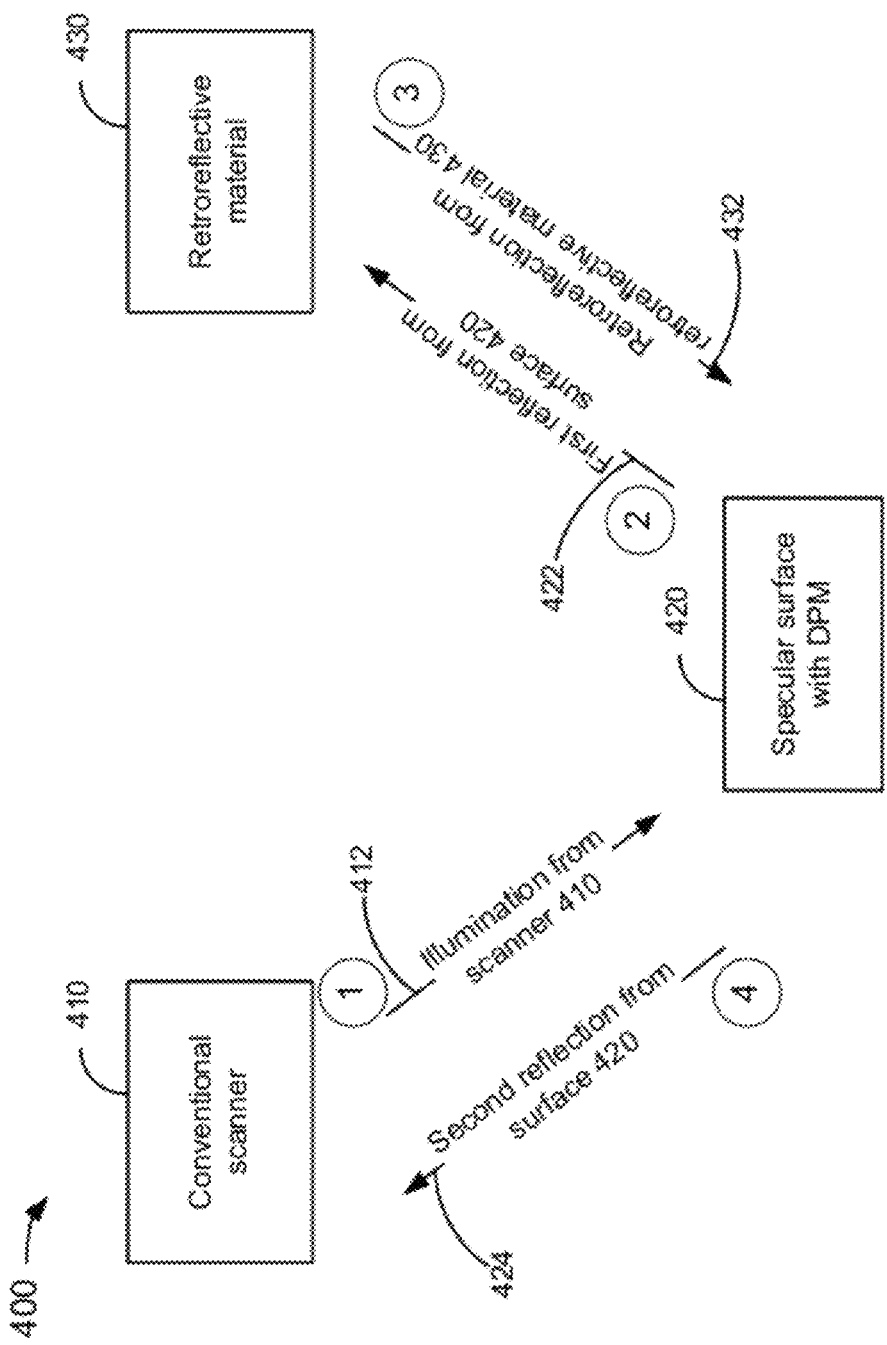
FIG. 4 depicts a block diagram of an example system for establishing an extended lighting field for illuminating and imaging symbols on a specular surface.

As shown in the block diagram 400 in FIG. 4, an extended lighting field for illuminating a specular surface for imaging DPM symbols on the surface is established using illumination from a conventional scanner 410 with a piece of retroreflective material 430 and the specular surface 420 itself. Initially, at step 412, illumination generated by the scanner 410 is directed to the specular surface 420 with the DPM symbols to be read. Next, at step 422, light reflects from the specular surface 420 a first time and impinges upon retroreflective material 430. Then at step 432, the reflected light is retroreflected by the retroreflective material 430 back to the specular surface 420. This retroreflected light functions as the extended lighting field that illuminates the specular surface 420 and allows the DPM symbols to be appropriately imaged by the scanner when at step 424, the retroreflected light reflects a second time from the surface 420 to the imaging sensor in the scanner 410. In this way, the retroreflective material 430 is able to provide "cloudy day" illumination.

Figure 5A:
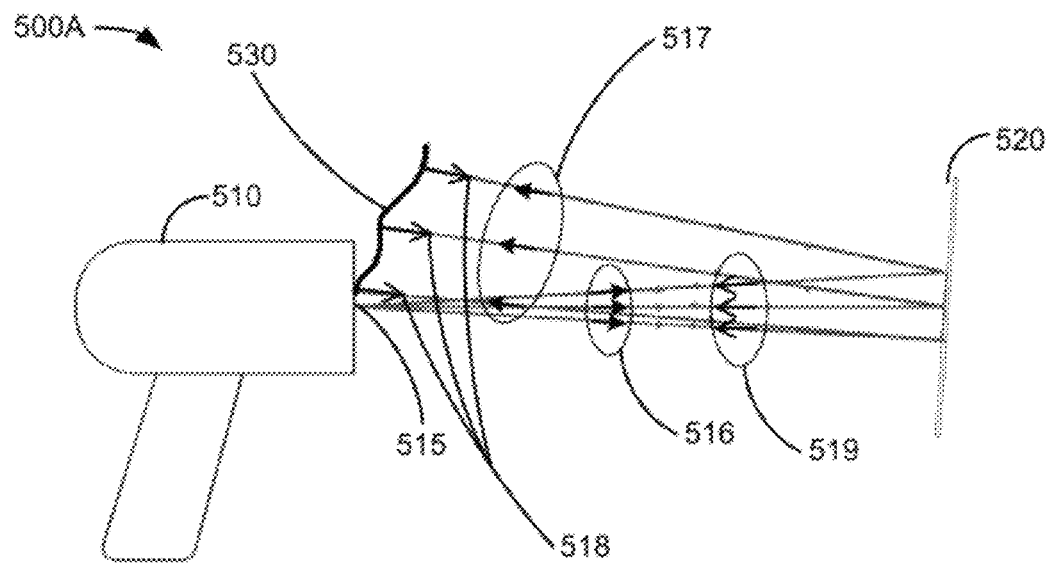
FIG. 5A shows a diagram of light rays from a scanner impinging on a specular surface at an angle and then being retroreflected back onto the specular surface with retroreflective material.

FIG. 5A shows a configuration 500A where a scanner 510 using a point light source emits illumination 515 towards a highly reflective surface 520 at an angle. A set or bundle of rays 516 represent light from the point source that impinge on the reflective surface 520. A reflected set or bundle of rays 517 reflects from the surface 520 and impinge upon a piece of retroreflective material 530. The retroreflective material 530 retroreflects the bundle of rays 517 back towards the specular surface as a bundle of rays 518. Finally, a bundle of rays 519 is reflected by the surface 520 to the imaging sensor in the scanner 510. The retroreflective material 530 in conjunction with the point light source of the scanner 510 and the specular surface 520 generates an extended lighting field that allows the sensor to clearly image the DPM symbols.

Figure 5B:
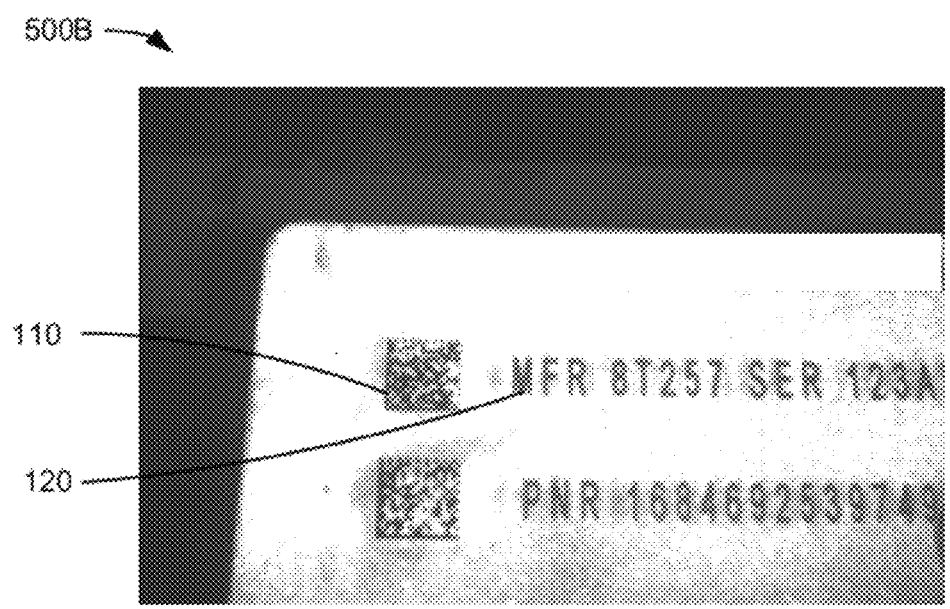
FIG. 5B shows an image of the specular surface of the markings of FIG. 1 illuminated in this configuration.

FIG. 5B shows an image 500B of the specular surface 520 illuminated with the configuration shown in FIG. 5A, and the specular surface 520 is the same as the specular surface 130 shown in FIG. 1. Both the data matrix code 110 and the text 120 are clearly seen in the image 500B. Additionally, because the intensity of the retroreflected light does not decrease as a function of the square of the distance from the retroreflective material 530, the imaging sensor receives a very strong signal of the DPM symbols independent of the distance of the specular surface 520 with the DPM symbols from the retroreflective material 530.

Figure 9:
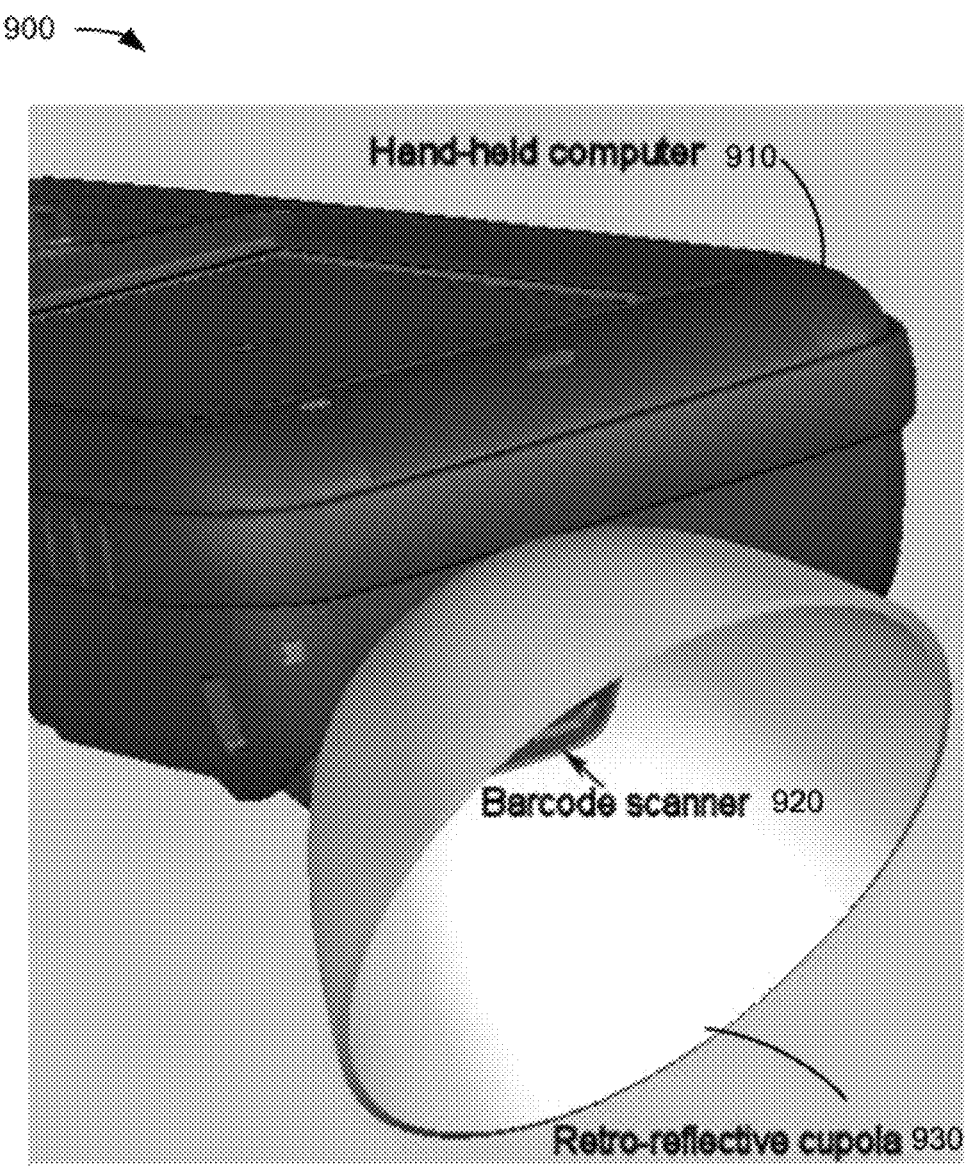
FIG. 9 shows an example diagram of a scanner with retroreflective material.

FIG. 9 shows an example configuration 900 of a scanner with retroreflective material. The scanner 920 is coupled to a hand-held computer 910, and the retroreflective material 930 is coupled to the junction between the scanner 920 and the computer 910. The retroreflective material 930 in this example is curved away from the scanner 920 such that light reflected from a reflective surface having symbols to be read can be intercepted by the retroreflected material 930 and retroreflected back to the reflective surface. Additionally, the cup shape of the retroreflective material 930 is centered around the scanner 920 so that it can retroreflect light from any direction without requiring the user to rotate the scanner 920. Further, while a cup shape is shown, any other shape may be used, including two or more different shaped pieces of retroreflective material.

The retroreflective material 930 may be removably secured to the scanner 920 using any known means. For example, a holder (not shown) coupled to the scanner 920 can be used to snap on the retroreflective material 930 to the scanner 920 when symbols on specular surfaces are to be read, and the retroreflective material 930 can be easily removed from the holder when not needed for reading symbols on non-specular surfaces.

The dimension of the retroreflective material 930 projected in the direction of the reflective surface with the DPM symbols determines the angular tolerance of the system. That is, the larger the dimensions of the retroreflective material 930, the higher the angular tolerance of the system. At a minimum, to illuminate the DPM symbols with no angular tolerance, the projected dimension of the retroreflective material 930 in the direction of the symbol being read should be at least twice the width of the symbol, for example, twice the length of a barcode or two times the longest dimension of a data matrix code. Any increase in size of the projected dimension of the retroreflective material 930 increases the angular tolerance of the system.

Figure 6A:
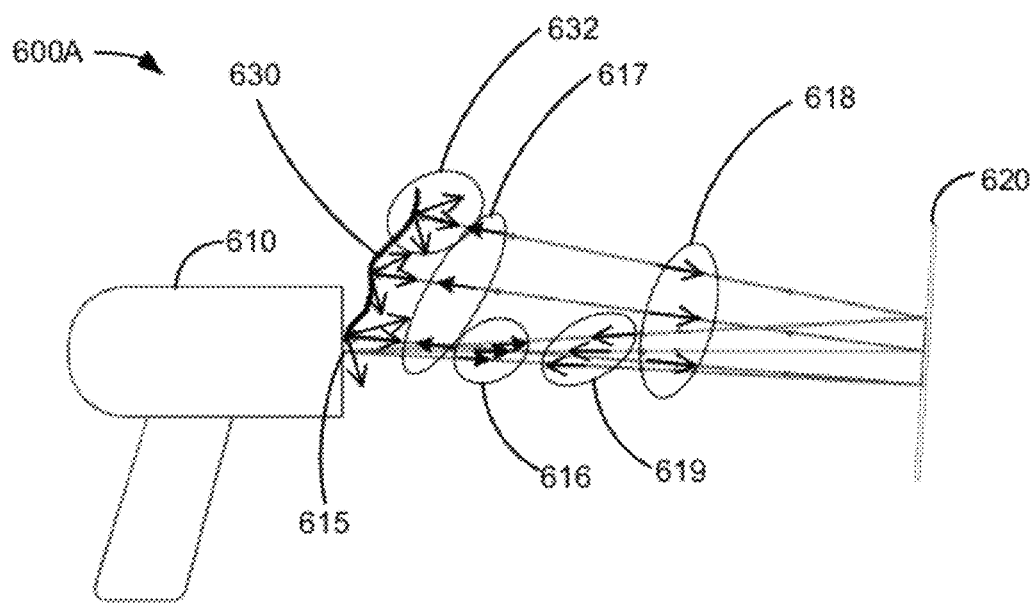
FIG. 6A shows a diagram of light rays from a scanner impinging on a specular surface at an angle and then being reflected back onto the specular surface with a Lambertian reflector.

In some limited cases, a Lambertian reflector, such as a piece of white paper, can be used in place of the retroreflective material. FIG. 6A shows a configuration 600A where a scanner 610 using a point light source emits illumination 615 towards a highly reflective surface 620 at an angle to the surface 620. The bundle of rays 616 represent the light from the point source that impinge on the reflective surface 620. The reflected bundle of rays 617 impinge upon a Lambertian reflector 630, such as a wrinkled or wavy piece of white paper or similar surface. The Lambertian reflector 630 may be any diffusive reflector that scatters incident light in many directions, as seen for example by the rays 632 scattered by the reflector 630. Among the rays scattered by the reflector 630, a subset 618 of the rays are reflected back in the direction of the specular surface 620. Ray bundle 619 reflects from the specular surface 620 back to the imaging sensor in the scanner 610.

Figure 6B:
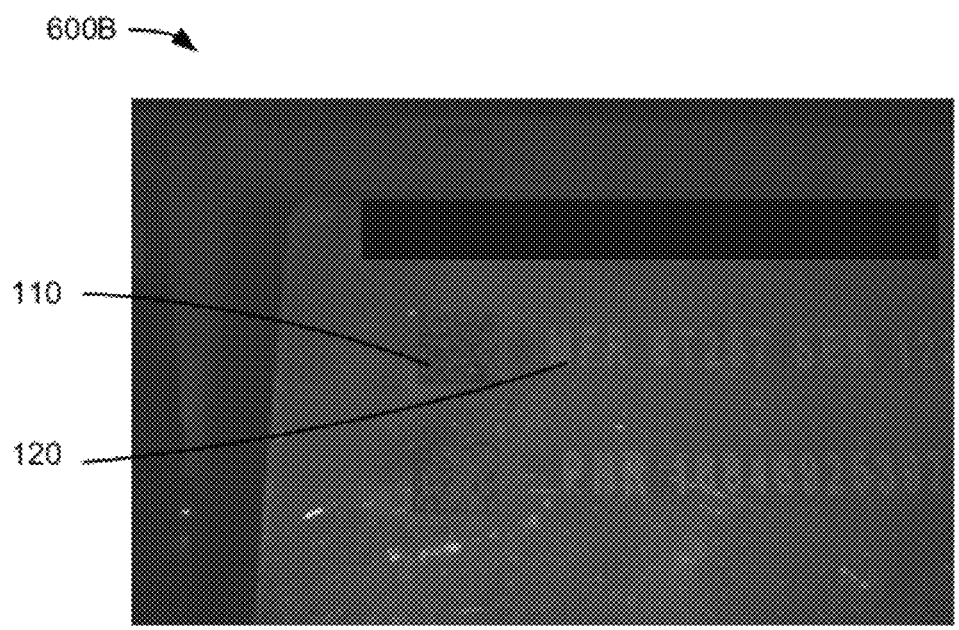
FIG. 6B shows an image of the specular surface of the markings of FIG. 1 illuminated in this configuration.

FIG. 6B shows an image 600B of the specular surface 620 illuminated with the configuration shown in FIG. 6A, and the specular surface 620 is the same as the specular surface 130 shown in FIG. 1. Neither the data matrix code 110 nor the text 120 can be seen clearly in the image 600B. The image 600B is very dim and may present difficulties with processing the DPM symbols. Because the Lambertian reflector 630 scatters the light impinging upon it, only a small percentage of the rays impinging upon it are reflected back towards the specular surface. In fact, the intensity of the light reflected from the Lambertian reflector 630 in any given direction is inversely proportional to the square of the distance from the reflector. Thus, using a Lambertian reflector for generating an extended lighting field for a specular surface only works for short working distances between the Lambertian reflector and the specular surface with the DPM symbols.

Figure 7:
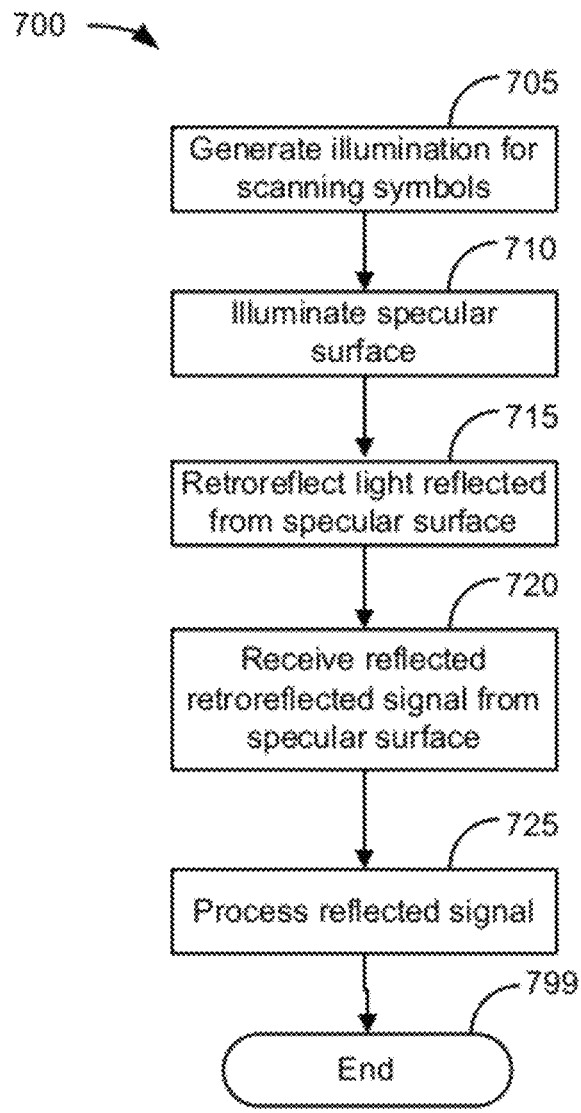
FIG. 7 is a flow diagram illustrating an example process of reading symbols on a specular surface.

FIG. 7 is a flow diagram illustrating an example process 700 of reading a machine readable symbol on a specular surface. At block 705, the system generates the illumination for illuminating and scanning the symbols. The source of the illumination can be one or more point light sources at one or more different wavelengths. The light from the light source can then be conditioned, for example, focused or collimated, using appropriate optics.

Because the specular surface is highly reflective, illumination impinging upon the surface is reflected. At block 715, the light reflected from the specular surface is retroreflected by the system. In an example configuration, retroreflecting material is removably coupled to the housing of a scanner that generates the illumination.

When the light is retroreflected by the retroreflecting material back towards the specular surface, at block 720 the system receives the retroreflected light that is reflected a second time from the specular surface. Because the retroreflected light from the retroreflecting material acts as a multi-point source, the retroreflected light provides illumination over a range of slightly different angles. As a result, the retroreflected light is distributed over any DPM symbols on the specular surface, and the light received by the sensor includes a strong signal reflected from the DPM symbols.

At block 725, the system processes the reflected signal. Processing steps can include, but are not limited to, filtering the signal, amplifying the signal, and digitizing the signal. The process ends at block 799.

Figure 8:
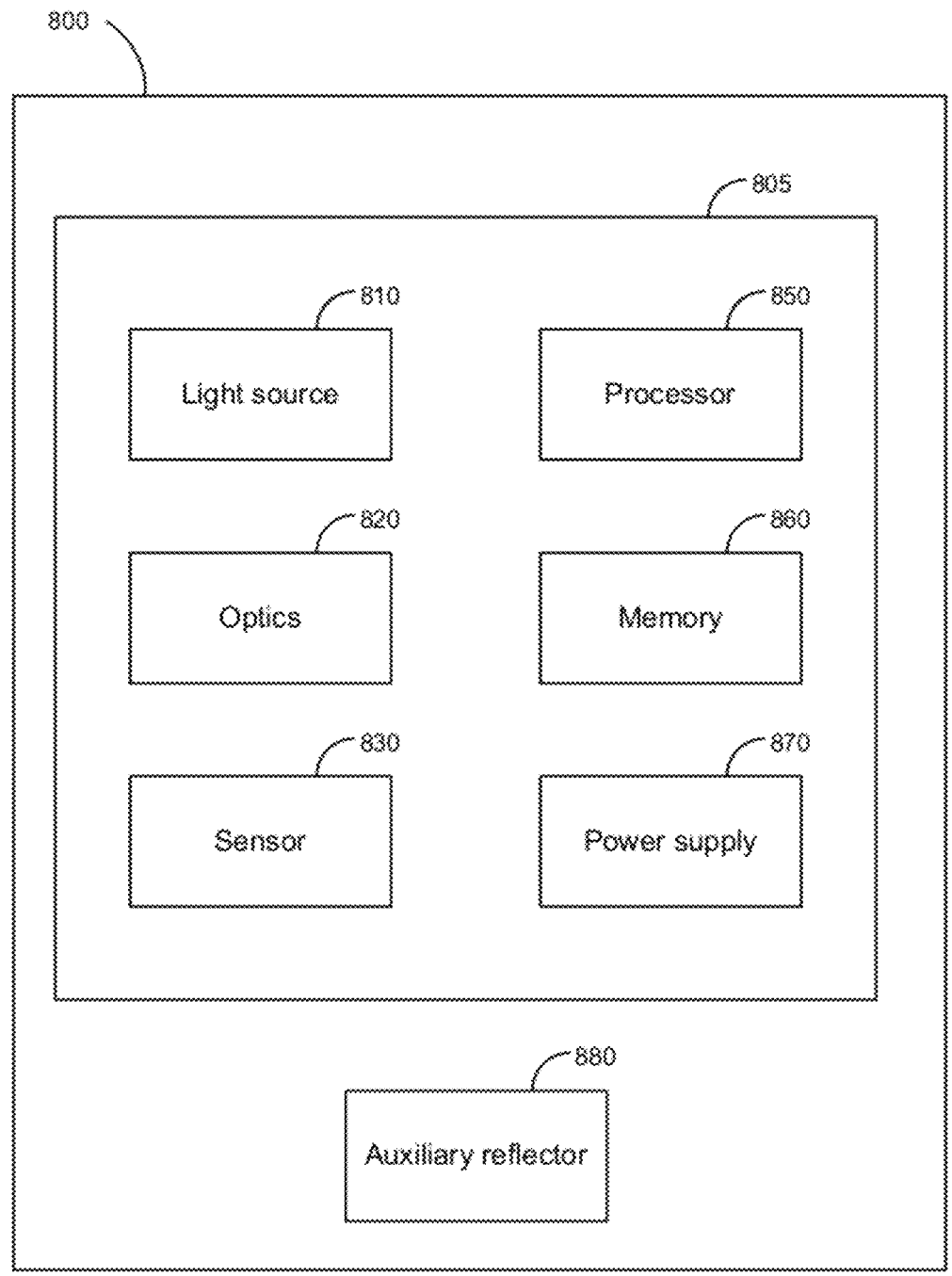
FIG. 8 shows an example block diagram of components of a system used to establish an extended specular lighting field for illuminating and imaging symbols on a specular surface.

FIG. 8 shows an example block diagram of a system 800 used to read symbols on a specular surface. The system can include a reader 805 and auxiliary reflector 880. The reader can include a light source 810, optics 820, imaging sensor 830, processor 850, memory 860, and power supply 870.

The light source 810 generates the light for illuminating the symbols to be read. Light sources that can be used include one or more LEDs, lasers, etc. The optics 820 condition the light from the light source 810 and can include, but are not limited to, focusing optics and/or collimating optics for conditioning the generated light from the light source 810, scanning optics for scanning the generated light across the symbols to be read, and collection optics for collecting the light reflected from the symbols to be processed by the scanner.

The imaging sensor 830 receives the light reflected from the symbols and converts the optical signal to an electrical signal. Non-limiting examples of the imaging sensor 830 include a charge-coupled device (CCD) and complementary metal-oxide semiconductor-based (CMOS) area imagers.

The processor 850 can be a microprocessor or any other type of processor used to run scanner applications to decode machine-readable symbols. Memory 860 can include but is not limited to, RAM, ROM, and any combination of volatile and non-volatile memory. A power supply 870 can include, but is not limited to, a battery.

In one configuration, the auxiliary reflector 840 is retroreflective material. Examples of types of retroreflective material include, but are not limited to, materials that incorporate substantially spherical glass beads or corner-cube microprisms into its surface. In another configuration, the auxiliary reflector 840 can be a Lambertian reflector, for example, a sheet of white paper. The auxiliary reflector 840 can be different shapes and sizes.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while DPM symbols are mentioned, any type of machine-readable symbol may be processed under the principles disclosed herein. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

I claim:

1. An apparatus for reading a symbol on a specular surface, the apparatus comprising:
    a reader configured to generate illumination from a point light source or sources to illuminate the symbol on the specular surface, wherein the specular surface reflects the illumination; and
    retroreflective material coupled to a housing of the reader and positioned to retroreflect the reflected illumination back towards the symbol when the reader housing is located away from and out of contact with the specular surface,
    wherein the retroreflective material comprises multiple reflector components that reflect light back in a direction from which the light originated, and
    further wherein the retroreflected illumination is reflected again from the specular surface and received at the reader for processing.

2. The apparatus of claim 1, wherein the symbol is a barcode, data matrix, or text, formed with direct part marking (DPM).

3. The apparatus of claim 1, wherein the retroreflective material is concave and curved in a direction away from the reader, and positioned proximate to a location of a light detector of the apparatus.

4. The apparatus of claim 1, further comprising a holder for the retroreflective material, wherein the holder is coupled to the housing of the reader, and the retroreflective material is removable.

5. The apparatus of claim 1, wherein a largest dimension of the retroreflective material is at least twice as long as a largest dimension of the symbol.

6. An apparatus for illuminating a symbol on a reflective surface, the apparatus comprising:
    a reader configured to generate light from a point light source or sources to illuminate a symbol on a reflective surface, wherein the reflective surface specularly reflects the light that illuminates the symbol; and
    a passive auxiliary reflector positioned to diffusely re-reflect the reflected light from the reflective surface back towards the reflective surface when the reader is located away from and out of contact with the reflective surface,
    wherein the re-reflected light is reflected again from the reflective surface to be received at the reader, for the reader to read the illuminated symbol despite the reflective surface.

7. The apparatus of claim 6, wherein the auxiliary reflector is Lambertian.

8. The apparatus of claim 6, wherein the auxiliary reflector comprises a sheet of paper.

9. The apparatus of claim 6, wherein the auxiliary reflector is retroreflective.

10. The apparatus of claim 6, wherein the auxiliary reflector is removably coupled to the reader.

11. The apparatus of claim 6, wherein the symbol is a barcode, data matrix, or text, formed with direct part marking (DPM).

12. The apparatus of claim 6, wherein the auxiliary reflector is cup-shaped with an opening of the cup-shape directed away from the reader.

13. The apparatus of claim 6, further comprising a holder for the auxiliary reflector, wherein the holder is coupled to the reader, and the auxiliary reflector is removable.

14. The apparatus of claim 6, wherein a largest dimension of the auxiliary reflector is at least twice as long as a largest dimension of the symbol.

15. A method of reading a symbol on a specular background with a reader located away from and out of contact with the specular background, comprising:
    generating light from a point light source or sources of a reader to illuminate the symbol on the specular background, wherein the reader is located away from and out of contact with the specular background;
    using retroreflective material, retroreflecting the light reflected from the specular background away from the reader and back towards the symbol, wherein the retroreflective material comprises multiple reflector components that reflect light back in a direction from which the light originated;
receiving the retroreflected light re-reflected from the specular background; and
processing the received light based on the received retroreflected light.

16. The method of claim 15, further comprising collimating the generated light for illuminating the symbol.

17. The method of claim 15, wherein illuminating the symbol comprises scanning the light over the symbol.

18. The method of claim 15, wherein retroreflecting the light comprises using retroreflective material, and wherein a largest dimension of the retroreflective material is at least twice as long as a largest dimension of the symbol.

19. A method of scanning a symbol on a reflective background with a reader located away from and out of contact with the reflective background, comprising:
generating illumination from a point light source or sources of a reader to illuminate the symbol on the reflective background, wherein the reader is located away from and out of contact with the reflective background;
using means for retroreflecting, retroreflecting the illumination reflected from the specular background away from the reader and back towards the symbol,
wherein the means for retroreflecting comprises multiple retroreflecting components that reflect light back in a direction from which the light originated; and
receiving the retroreflected illumination re-reflected from the reflective background.

* * * * *